United States Patent
Flick et al.

(10) Patent No.: US 7,379,730 B2
(45) Date of Patent: May 27, 2008

(54) VEHICLE SECURITY SYSTEM RECEIVING ACKNOWLEDGMENT OF TRANSMITTED VEHICLE SECURITY MESSAGE AND RELATED METHODS

(75) Inventors: Kenneth E. Flick, Douglasville, GA (US); Edward P. Muldowney, Prosper, TX (US)

(73) Assignee: Omega Patents, L.L.C., Douglasville, GA (US)

( * ) Notice: Subject to any disclaimer, the term of this patent is extended or adjusted under 35 U.S.C. 154(b) by 484 days.

(21) Appl. No.: 11/144,866

(22) Filed: Jun. 3, 2005

(65) Prior Publication Data

US 2006/0276162 A1 Dec. 7, 2006

(51) Int. Cl.
*H04M 1/66* (2006.01)

(52) U.S. Cl. .................. 455/410; 455/404.1; 455/411; 340/426.1; 340/426.16

(58) Field of Classification Search ................ 455/410, 455/404.1, 569.1, 569.2, 456.1, 575.9, 425, 455/426, 550.1, 575.1, 561, 456.5, 456.6, 455/411, 404.2; 342/357.01–357.17, 457, 342/357; 379/58, 59, 37, 38, 39, 40–44, 379/47–60; 340/945, 988, 425.5, 426.1, 340/427, 426.16, 426.18, 426.26–426.36, 340/989, 825.36, 825.49
See application file for complete search history.

(56) References Cited

U.S. PATENT DOCUMENTS

| | | | | |
|---|---|---|---|---|
| 4,698,805 A | * | 10/1987 | Sasuta et al. ................ 370/327 |
| 5,223,844 A | * | 6/1993 | Mansell et al. ........ 342/357.07 |
| 5,432,841 A | | 7/1995 | Rimmer ........................ 379/59 |
| 5,515,043 A | * | 5/1996 | Berard et al. ................ 340/988 |
| 5,515,419 A | * | 5/1996 | Sheffer ..................... 455/456.5 |
| 5,526,401 A | | 6/1996 | Roach, Jr. et al. ............. 379/59 |
| 5,546,444 A | | 8/1996 | Roach, Jr. et al. ............. 379/59 |
| 5,794,144 A | | 8/1998 | Comer et al. ................ 455/426 |
| 6,125,275 A | | 9/2000 | Comer et al. ................ 455/426 |
| 6,370,378 B1 | * | 4/2002 | Yahagi ....................... 455/433 |
| 6,737,989 B2 | | 5/2004 | Flick .......................... 340/989 |
| 6,844,827 B2 | | 1/2005 | Flick .......................... 340/989 |
| 6,847,825 B1 | | 1/2005 | Duvall et al. ............. 455/456.3 |
| 6,876,858 B1 | | 4/2005 | Duvall et al. ............. 455/456.1 |
| 2007/0015548 A1 | * | 1/2007 | Flick ....................... 455/569.2 |

\* cited by examiner

*Primary Examiner*—Edward Urban
*Assistant Examiner*—Charles Chow
(74) *Attorney, Agent, or Firm*—Allen Dyer Doppelt Milbrath & Gilchrist

(57) ABSTRACT

A vehicle security system for cooperating with a communications network includes a plurality of communication nodes in which a given communication node may transmit an acknowledgment message to an adjacent wireless transceiver upon receipt of a message therefrom. The vehicle security system may include a wireless transceiver and a security controller at the vehicle. The security controller may transmit a message related to vehicle security via the wireless transceiver. The security controller may retransmit the message related to vehicle security if the wireless transceiver does not receive an acknowledgment message from an adjacent communication node. The security controller may not retransmit the message related to vehicle security if the wireless transceiver does receive an acknowledgment message from the adjacent communication node.

19 Claims, 3 Drawing Sheets

VEHICLE SECURITY SYSTEM RECEIVING ACKNOWLEDGMENT OF TRANSMITTED VEHICLE SECURITY MESSAGE AND RELATED METHODS

FIELD OF THE INVENTION

The invention relates to the field of vehicle devices, and, more particularly, to a vehicle security system and related methods.

BACKGROUND OF THE INVENTION

Several conventional vehicle security systems include a security controller connected to a wireless transceiver that communicates with a communications network to send an alert message to a monitoring station in response to a security breach. For example, U.S. Pat. Nos. 6,737,989 and 6,844,827 to Flick disclose a communication network in communication with a vehicle security system, which includes a controller connected to a position-determining device and a wireless transceiver. If the controller determines a security breach has occurred, it then sends an alert message via the wireless transceiver to a monitoring station or to a user via the communications network. The alert message may be generated by the controller based on the vehicle moving beyond a radial threshold distance from a user selected reference location, for example.

U.S. Pat. Nos. 6,297,768; 6,476,763; 6,484,035; and 6,710,738 to Allen, Jr. disclose a vehicle security system wirelessly connected to a communications network. The vehicle security system includes a controller connected to a Global Positioning System (GPS) receiver, a vehicle switch, and a wireless transceiver. The controller is asleep until the wireless transceiver or the vehicle switch sends a wake-up signal to the controller. The controller then reports the location of the vehicle based upon the GPS receiver via the wireless transceiver to a monitoring station connected to the communications network.

U.S. Pat. Nos. 6,847,825 and 6,876,858 to Duvall et al. disclose a vehicle security system including a vehicle tracking unit cooperating with a monitoring station via a communications network to locate a vehicle. The vehicle tracking unit includes a controller cooperating with a GPS receiver and a wireless transceiver. After a user calls the monitoring station, the monitoring station queries the vehicle security system via the communications network, which activates the GPS receiver. The activated GPS receiver determines the vehicle location and forwards this data to the monitoring station via the wireless transceiver using the communications network.

U.S. Pat. No. 6,169,497 to Robert discloses a mobile tracking system for a vehicle including a security controller connected to a wireless transmitter for sending an alert message to a communications network that an initiation state for tracking the vehicle has occurred. The system includes a plurality of mobile stations in communication with the wireless transmitter, and each mobile station includes a position-determining device. The system locates and tracks the vehicle based on signals transmitted by the wireless transmitter using a triangulation algorithm and data generated by each position-determining device.

Other references disclose the combination of a cellular communications device communicating with a cellular mobile radiotelephone system to send an acknowledgment message to confirm receipt of a paging message. For instance, U.S. Pat. Nos. 5,526,401 and 5,546,444 to Roach, Jr. et al., and U.S. Pat. Nos. 5,794,144 and 6,125,275 to Comer et al. disclose a cellular mobile radiotelephone system including a paging acknowledgment system that can confirm reception of a transmitted paging message. The paging acknowledgment system includes a communications system, remote communications devices, and a mobile switching center. The remote communications device responds to a message containing its particular address by transmitting an acknowledgment message to the mobile switching center, which forwards the acknowledgment message to the communications system.

Unfortunately, such conventional vehicle security systems may result in redundant or unnecessary communication between the vehicle security system and the communications network. Such unnecessary communications may result in greater operational cost of the vehicle security system as well as inconvenience for the user.

SUMMARY OF THE INVENTION

In view of the foregoing background, it is therefore an object of the invention to reduce unnecessary communication between a vehicle security system and a communications network.

This and other objects, features, and advantages in accordance with the invention are provided by a vehicle security system for cooperating with a communications network including a plurality of communication nodes in which a given communication node may transmit an acknowledgment message to an adjacent wireless transceiver upon receipt of a message therefrom. The vehicle security system may comprise a wireless transceiver and a security controller at the vehicle. The security controller may transmit a message related to vehicle security via the wireless transceiver. The security controller may retransmit the message related to vehicle security if the wireless transceiver does not receive an acknowledgment message from an adjacent communication node. The security controller may not retransmit the message related to vehicle security if the wireless transceiver does receive an acknowledgment message from the adjacent communication node. Accordingly, the vehicle security system has reduced communication via the communications network.

The communication network may comprise a cellular communication network with each communication node comprising a cellular base station, for example. The wireless transceiver may thus comprise a wireless cellular transceiver. The vehicle security system may comprise a monitoring station for receiving, via the communications network, the message related to vehicle security from the security controller.

The vehicle security system may comprise a position-determining device at the vehicle for determining a geographic position thereof. The position-determining device may comprise a Global Positioning System (GPS) receiver. The vehicle security-system may comprise a vehicle security sensor connected to the security controller. The security controller may also comprise a data bus interface for interfacing to a data communications bus extending throughout the vehicle.

A method aspect of the invention is directed to using a vehicle security system that cooperates with a communications network. The communications network may comprise a plurality of communication nodes in which a given communication node transmits an acknowledgment message to an adjacent wireless transceiver upon receipt of a message therefrom. The vehicle security system may comprise a wireless transceiver and a security controller at the vehicle. The method may comprise using a security controller to transmit a message related to vehicle security via the wireless transceiver, and using the security controller to retransmit the message related to vehicle security if the wireless transceiver does not receive an acknowledgment message from an adjacent communication node. The method may further comprise using the security controller to not retransmit the message related to vehicle security if the wireless transceiver does receive an acknowledgment message from the adjacent communication node.

DETAILED DESCRIPTION OF THE PREFERRED EMBODIMENTS

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
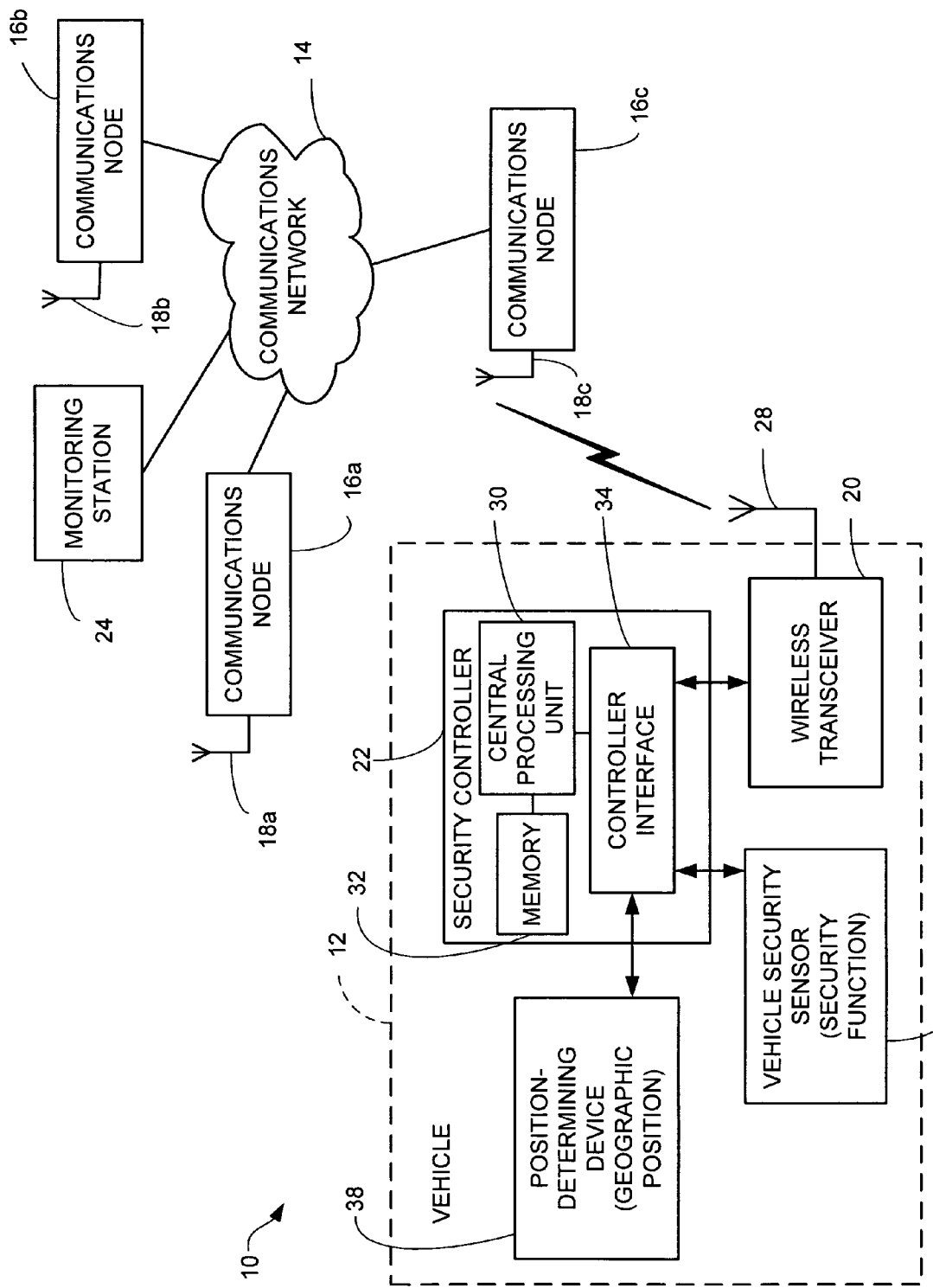
FIG. 1 is a schematic block diagram of the vehicle security system according to the invention.

Referring initially to FIG. 1, a vehicle security system 10 for a vehicle 12 in accordance with the invention is now described. The vehicle security system 10 cooperates with a communications network 14 that includes a plurality of communication nodes 16a-16c as will be appreciated by those of skill in the art.

The communication nodes 16a-16c include respective communication node antennas 18a-18c. A wireless transceiver antenna 28 is connected to a wireless transceiver 20. A given communication node 16a-16c may transmit over a communications link an acknowledgment message to any adjacent wireless transceiver upon receipt of a message from the wireless transceiver as will be appreciated by those of skill in the art.

The vehicle security system 10 comprises a wireless transceiver 20 and a security controller 22 at the vehicle 12. The security controller 22 includes a central processing unit 30 connected to a memory 32, and a controller interface 34 as will be appreciated by those of skill in the art. The controller interface 34 permits the security controller 22 to interface with other vehicle devices such as one or more vehicle security sensors 40, for example.

The security controller 22 transmits a message related to vehicle security via the wireless transceiver 20 as will be appreciated by those of skill in the art. Such a message related to vehicle security may include information about the vehicle condition, vehicle location, status of various vehicle systems, and the like. For instance, the message related to vehicle security may include information that the vehicle security sensor 40 has triggered the vehicle security system 10.

The vehicle security system 10 may comprise a monitoring station 24 for receiving, via the communications network 14, the message related to vehicle security from the security controller 22. As will be appreciated by those of skill in the art, the monitoring station 24 may notify the police, the user, or the like based upon the message related to vehicle security. Alternately, the user could be notified directly.

The security controller 22 retransmits the message related to vehicle security if the wireless transceiver 20 does not receive an acknowledgment message from an adjacent communication node 16a-16c, for example. The retransmission of the message until an acknowledgment is received from at least one of the communication nodes 16a-16c helps to ensure that the message was successfully transmitted to the communications network 14.

The security controller 22 does not retransmit the message related to vehicle security if the wireless transceiver 20 does receive an acknowledgment message from the adjacent communication node 16c, for example. This helps to limit unnecessary communication between the vehicle security system 10 and the communications network 14.

For instance, there may be a problem in the communications network preventing the wireless transceiver from receiving a confirmation message of the prior art. The security controller would keep sending the message related to vehicle security and the monitoring station would keep sending alerts to the user in response to the message related to vehicle security. As a result, the user is inconvenienced because the monitoring station has already notified him about the message related to vehicle security and the repeated alerts are costing the user unnecessary cellular charges. Accordingly, the vehicle security system 10 may reduce unnecessary communication with the communications network 14.

The vehicle security system 10 may comprise a position-determining device 38 at the vehicle 12 for determining a geographic position thereof. The geographic position of the vehicle 12 may be sent as part of the message related to vehicle security and/or may act as the trigger, or part of the trigger, for the security controller 22 to transmit the message related to vehicle security as will be appreciated by those of skill in the art. The position-determining device 38 may comprise a Global Positioning System (GPS) receiver, for example.

The vehicle security sensor 40 may comprise a door pin switch, motion sensor, and the like. The security controller 22 may cooperate with the vehicle security sensor 40 to provide a vehicle security function as will be appreciated by those of skill in the art. The information generated by the vehicle security sensor 40 may be sent as part of the message related to vehicle security and/or may act as the trigger for the security controller 22 to transmit the message related to vehicle security.

Figure 2:
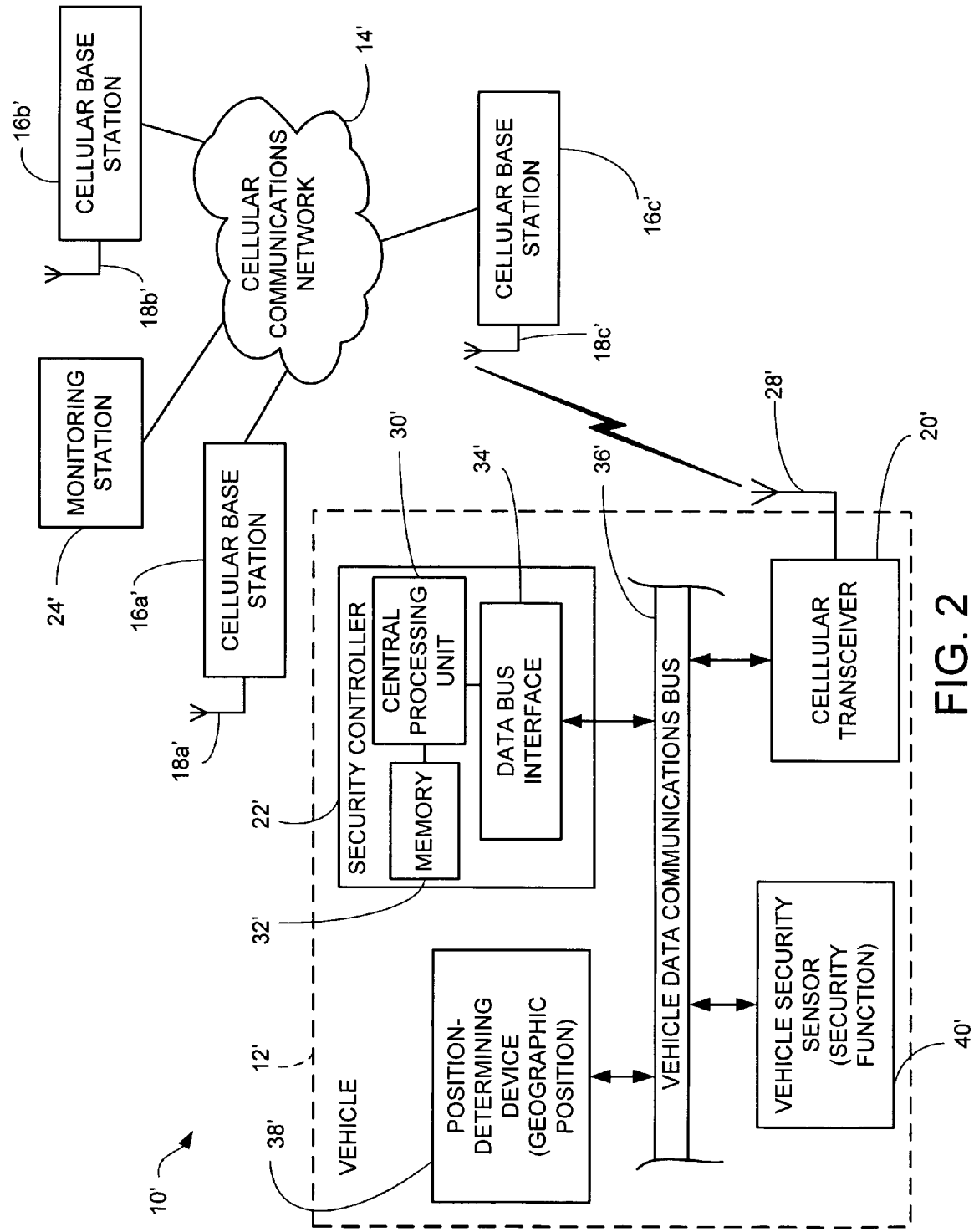
FIG. 2 is a schematic block diagram of an alternate embodiment of the vehicle security system according to the invention.

Referring now additionally to an alternate embodiment of the invention in FIG. 2, the communication network may comprise a cellular communication network 14' with each communication node comprising a cellular base station 16a'-16c' as will be appreciated by those of skill in the art. The wireless transceiver may comprise a cellular transceiver 20', for example. The controller 22' also illustratively comprises a data bus interface 34' for interfacing to a data communications bus 36' extending throughout the vehicle 12' thereby permitting the controller to interface with other vehicle devices. As will be appreciated by those of skill in the art, the controller 22' may interface with other vehicle devices using a hardwired controller interface.

Figure 3:
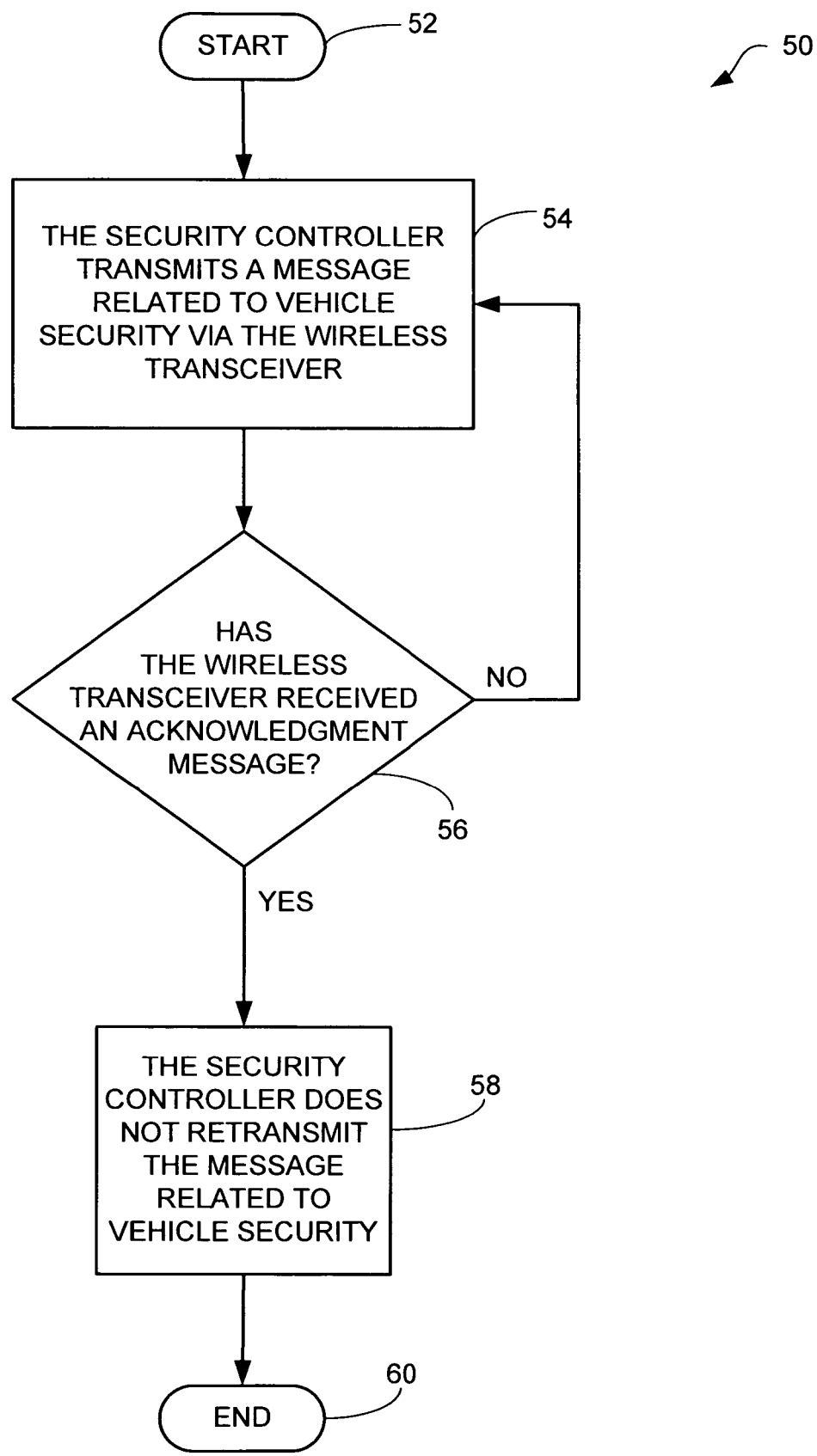
FIG. 3 is a flowchart illustrating a method according to the invention.

A method aspect of the invention is directed to using the vehicle security system 10 and is now described with reference to the flowchart 50 of FIG. 3. The method is directed to using a vehicle security system 10 that cooperates with a communications network 14. The communications network 14 may comprise a plurality of communication nodes 16a-16c in which a given communication node transmits an acknowledgment message to an adjacent wireless transceiver 20 upon receipt of a message therefrom. The vehicle security system 10 may comprise a wireless transceiver 20 and a security controller 22 at the vehicle 12.

The method starts at Block 52 and comprises using the security controller 22 to transmit a message related to vehicle security via the wireless transceiver 20 at Block 54. The security controller 22 then determines if the wireless transceiver 20 has received an acknowledgment message at Block 56. If the wireless transceiver 20 does not receive an acknowledgment message from an adjacent communication node 16a-16c, then the security controller 22 retransmits the message related to vehicle security. If the wireless transceiver 20 does receive an acknowledgment message from the adjacent communication node 16a-16c, then the security controller 22 does not retransmit the message related to vehicle security at Block 58. The method ends at Block 60.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A vehicle security system for cooperating with a communications network comprising a plurality of communication nodes, a given communication node transmitting an autonomously generated acknowledgment message to an adjacent wireless transceiver upon receipt of a message therefrom, the vehicle security system comprising:
a wireless transceiver at the vehicle; and
a security controller at the vehicle for
transmitting a message related to vehicle security via said wireless transceiver,
retransmitting the message related to vehicle security if said wireless transceiver does not receive an autonomously generated acknowledgment message from an adjacent communication node, and
not retransmitting the message related to vehicle security if said wireless transceiver does receive an autonomously generated acknowledgment message from the adjacent communication node.

2. The vehicle security system according to claim 1 wherein the communication network comprises a cellular communication network with each communication node comprising a cellular base station; and wherein said wireless transceiver comprises a cellular transceiver.

3. The vehicle security system according to claim 1 further comprising a monitoring station for receiving, via the communications network, the message related to vehicle security from said security controller.

4. The vehicle security system according to claim 1 further comprising a position-determining device at the vehicle for determining a geographic position thereof.

5. The vehicle security system according to claim 4 wherein said position-determining device comprises a Global Positioning System (GPS) receiver.

6. The vehicle security system according to claim 1 further comprising at least one vehicle security sensor connected to said security controller.

7. The vehicle security system according to claim 1 wherein said security controller comprises a data bus interface for interfacing to a data communications bus extending throughout the vehicle.

8. A vehicle security system for cooperating with a cellular communications network comprising a plurality of cellular base stations, each cellular base station transmitting an autonomously generated acknowledgment message to an adjacent cellular transceiver upon receipt of a message therefrom, the vehicle security system comprising:
a cellular transceiver at the vehicle;
a security controller at the vehicle for
transmitting a message related to vehicle security via said cellular transceiver,
retransmitting the message related to vehicle security if said cellular transceiver does not receive an autonomously generated acknowledgment message from an adjacent cellular base station, and
not retransmitting the message related to vehicle security if said cellular transceiver does receive an autonomously generated acknowledgment message from the adjacent cellular base station; and
at least one vehicle security sensor connected to said security controller.

9. The vehicle security system according to claim 8 further comprising a monitoring station for receiving, via the communications network, the message related to vehicle security from said security controller.

10. The vehicle security system according to claim 8 further comprising a position-determining device at the vehicle for determining a geographic position thereof.

11. The vehicle security system according to claim 10 wherein said position-determining device comprises a Global Positioning System (GPS) receiver.

12. The vehicle security system according to claim 8 wherein said security controller comprises a data bus interface for interfacing to a data communications bus extending throughout the vehicle.

13. A method for using a vehicle security system cooperating with a communications network comprising a plurality of communication nodes, a given communication node transmitting an autonomously generated acknowledgment message to an adjacent wireless transceiver upon receipt of a message therefrom, and the vehicle security system comprising a wireless transceiver and a security controller at the vehicle, the method comprising:
using the security controller to transmit a message related to vehicle security via the wireless transceiver;
using the security controller to retransmit the message related to vehicle security if the wireless transceiver does not receive an autonomously generated acknowledgment message from an adjacent communication node; and
using the security controller to not retransmit the message related to vehicle security if the wireless transceiver does receive an autonomously generated acknowledgment message from the adjacent communication node.

14. The method according to claim 13 wherein the communication network comprises a cellular communication network with each communication node comprising a cellular base station; and wherein the wireless transceiver comprises a cellular transceiver.

15. The method according to claim 13 further comprising providing a monitoring station for receiving, via the communications network, the message related to vehicle security from the security controller.

16. The method according to claim 13 further comprising providing a position-determining device at the vehicle for determining a geographic position thereof.

17. The method according to claim 16 wherein the position-determining device comprises a Global Positioning System (GPS) receiver.

18. The method according to claim 13 further comprising providing at least one vehicle security function.

19. The method according to claim 13 wherein the security controller comprises a data bus interface for interfacing to a data communications bus extending throughout the vehicle.

* * * * *